US012742692B2

(12) United States Patent
Song et al.

(10) Patent No.: US 12,742,692 B2
(45) Date of Patent: Sep. 22, 2026

(54) SPUTTERED FILM SIX-DIMENSIONAL FORCE SENSOR ELASTOMER STRUCTURE BASED ON IMPROVED CROSS BEAM

(71) Applicant: SOUTHEAST UNIVERSITY, Jiangsu (CN)

(72) Inventors: Aiguo Song, Jiangsu (CN); Jingjing Xu, Jiangsu (CN); Yuhan Chen, Jiangsu (CN); Baoguo Xu, Jiangsu (CN); Huijun Li, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 277 days.

(21) Appl. No.: 18/648,462

(22) Filed: Apr. 28, 2024

(65) Prior Publication Data

US 2024/0328876 A1 Oct. 3, 2024

Related U.S. Application Data

(63) Continuation of application No. PCT/CN2023/089135, filed on Apr. 19, 2023.

(30) Foreign Application Priority Data

Apr. 3, 2023 (CN) ......................... 202310345931.4

(51) Int. Cl.
*G01L 1/22* (2006.01)

(52) U.S. Cl.
CPC .................................. *G01L 1/2287* (2013.01)

(58) Field of Classification Search
None
See application file for complete search history.

(56) References Cited

U.S. PATENT DOCUMENTS 3,628,394 A * 12/1971 Keatinge ............... G01L 5/1627 244/236
4,821,582 A * 4/1989 Meyer .................. G01L 5/1627 73/146
5,526,700 A * 6/1996 Akeel ....................... G01L 1/18 73/862.042

(Continued)

FOREIGN PATENT DOCUMENTS

CN 106153237 11/2016
CN 107044898 8/2017

(Continued)

OTHER PUBLICATIONS

"International Search Report (Form PCT/ISA/210) of PCT/CN2023/089135," mailed on Dec. 26, 2023, pp. 1-4.

(Continued)

*Primary Examiner* — Alexander A Mercado
(74) *Attorney, Agent, or Firm* — JCIPRNET

(57) ABSTRACT

A six-dimensional force sensor elastomer structure based on improved cross beam includes main beams, first floating beams, second floating beams, square corners and thin film strain gauges. Strain gauges are sputtered on the main beams and the first floating beams to form a plurality of sets of Wheatstone bridges. When an input force/moment of a certain dimension acts on the center of an elastomer, the sensor is deformed and resistance values of strain gauges at corresponding positions change, so that output voltages of corresponding bridges are changed.

2 Claims, 2 Drawing Sheets

(56) References Cited

U.S. PATENT DOCUMENTS

| | | | | |
|---|---|---|---|---|
| 5,889,214 | A * | 3/1999 | Kang | G01L 5/1627<br>73/862.043 |
| 5,969,268 | A * | 10/1999 | Sommerfeld | G01L 5/1627<br>73/862.041 |
| 2015/0135856 | A1* | 5/2015 | Kim | G01L 1/22<br>73/862.045 |
| 2020/0309617 | A1* | 10/2020 | Mukai | G01L 1/2262 |
| 2020/0309626 | A1* | 10/2020 | Mukai | G01L 5/10 |
| 2020/0408625 | A1* | 12/2020 | Berme | G01L 1/22 |
| 2021/0293642 | A1* | 9/2021 | Song | G01L 5/1627 |
| 2021/0333163 | A1* | 10/2021 | Berme | G01L 5/0052 |
| 2022/0178775 | A1* | 6/2022 | Berme | G01L 5/161 |
| 2022/0299382 | A1* | 9/2022 | Yamaguchi | G01L 1/2262 |
| 2024/0328873 | A1* | 10/2024 | Song | G01L 1/2287 |

FOREIGN PATENT DOCUMENTS

| | | |
|---|---|---|
| CN | 109238528 | 1/2019 |
| CN | 111272328 | 6/2020 |
| CN | 115683434 | 2/2023 |
| GB | 2614373 | 7/2023 |

OTHER PUBLICATIONS

"Written Opinion of the International Searching Authority (Form PCT/ISA/237) of PCT/CN2023/089135," mailed on Dec. 26, 2023, pp. 1-4.

* cited by examiner

SPUTTERED FILM SIX-DIMENSIONAL FORCE SENSOR ELASTOMER STRUCTURE BASED ON IMPROVED CROSS BEAM

CROSS-REFERENCE TO RELATED APPLICATION

This application is a continuation of international application of PCT application serial no. PCT/CN2023/089135 filed on Apr. 19, 2023, which claims the priority benefit of China application no. 202310345931.4, filed on Apr. 3, 2023. The entirety of each of the above mentioned patent applications is hereby incorporated by reference herein and made a part of this specification.

BACKGROUND

Technical Field

The present disclosure belongs to the technical field of sensors, and particularly relates to a six-dimensional force sensor elastomer structure based on improved cross beam and capable of realizing a sputtering process.

Description of Related Art

A multi-dimensional force sensor, by sensing force components and moment components in multiple dimensions of space at the same time, is capable to obtain complete force information from complex systems, and is widely used in the fields of haptic human-computer interaction (HHCI), humanoid robots, aerospace, biomedical research, medical equipment, automobiles, etc. A resistance strain-type multi-dimensional force sensor based on a cross-beam structure is currently the most widely used sensor, which converts deformation of the sensor under stress into a voltage change through strain gauges, and achieves the measurement of force components and moment components.

Since most of multi-dimensional force sensors currently developed usually adopt strain gauges pasted in a conventional manner, having the defects such as a low temperature range and performance degradation due to volatilization and condensation of glue. A sputtering process does not necessitate the use of glue, so it is of great practical significance to sputter thin film strain gauges through the sputtering process.

SUMMARY

In order to solve the above problems, the present disclosure discloses a six-dimensional force sensor elastomer structure based on improved cross beam and capable of realizing a sputtering process. The structure has the advantages of high sensitivity and low inter-dimensional coupling, and is suitable for multi-dimensional force measurement in the aerospace field.

In order to realize the above objective, the present disclosure provides a technical solution as follows:

a six-dimensional force sensor elastomer structure based on improved cross beam and capable of realizing a sputtering process, including main beams, first floating beams, second floating beams, square corners and thin film strain gauges; and the main beams are four rectangular beams each with a square section; the four rectangular beams are connected to each other at one end thereof to form a cross, and the other end of each rectangular beam is connected to a corresponding first floating beam; the force or the moment acts on the center of the cross; the first floating beams are four rectangular thin-walled beams each with a rectangular section; the center of an inner side surface of the first floating beam is connected with the main beam, and both ends thereof are connected with the corresponding square corners; the second floating beams are four rectangular thin-walled beams each with a rectangular section; the second floating beam is parallel to the horizontal part of main beam, and one end of the second floating beam is connected with the main beam, and the other end thereof is connected with the first floating beam; the axis of the second floating beam is located at the center between the horizontal part of main beam and the horizontal part of first floating beam; the square corners are four cylinders of a cuboid structure each with a square section; four connecting holes are formed on the square corners for fixing; and the main beam is in the middle, the first floating beam is at the periphery, the second floating beam is located between the horizontal part of main beam and the horizontal part of first floating beam.

The measurement principle of the six-dimensional force sensor is that: 24 thin film strain gauges are sputtered on the main beams and the first floating beams to form six sets of Wheatstone bridges, with three sets on the main beam and three sets on the first floating beam. A total of four strain gauges are arranged on the outer side surfaces of the vertical part of first floating beam close to the center of the main beam, to form a bridge circuit for measuring an acting force Fx in the X direction; a total of four strain gauges are arranged on the outer side surfaces of the horizontal part of first floating beam close to the center of the main beam, to form a bridge circuit for measuring an acting force Fy in the Y direction; a total of four strain gauges on the main beam in the X direction are arranged on upper and lower surfaces of two beams close to the center boss, to form a bridge circuit for measuring an acting force Fz in the Z direction; a total of four strain gauges on the main beam in the Y direction are arranged on upper and lower surfaces of two beams away from the center boss, to form a bridge circuit for measuring an acting moment Mx in the X direction; a total of four strain gauges on the main beam in the X direction are arranged on upper and lower surfaces of two beams away from the center boss, to form a bridge circuit for measuring an acting moment My in the Y direction; and a total of four strain gauges are arranged on the outer side surfaces of the first floating beam close to the second floating beam, to form a bridge circuit for measuring an acting moment Mz in the Z direction. When a force/moment of a certain dimension acts on the center of the elastomer, the sensor is deformed and resistance values of thin film strain gauges at corresponding positions change, so that output voltages of corresponding bridges are changed. A value of the force/moment in each dimension can be obtained by measuring voltage changes.

The present disclosure features the following beneficial effects:

(1) the six-dimensional force sensor capable of realizing a sputtering process designed by the present disclosure avoids the problems of low stability and poor resistance to heat and humidity when a patch method is adopted for the multi-dimensional force sensor, and improves the stability of the sensor;

(2) the six-dimensional force sensor capable of realizing a sputtering process designed by the present disclosure is based on the principle of resistance strain, and a rectangular beam structure is adopted for sensitive parts, thus having high measurement sensitivity;

(3) the six-dimensional force sensor capable of realizing a sputtering process designed by the present disclosure, by combining the main beam and the floating beams, effectively reduces an inter-dimensional coupling error and has higher measurement accuracy;

(4) the six-dimensional force sensor capable of realizing a sputtering process designed by the present disclosure adopts an integrated design, which effectively reduces an internal stress error caused during assembly and improves the sensor accuracy; and (5) the six-dimensional force sensor capable of realizing a sputtering process designed by the present disclosure is simple in structure and easy to process.

DESCRIPTION OF THE EMBODIMENTS

The present disclosure will be further described below with reference to the accompanying drawings and specific embodiments. It should be understood that the following specific embodiments are only used to illustrate the present disclosure and are not intended to limit the scope of the present disclosure.

Figure 1:
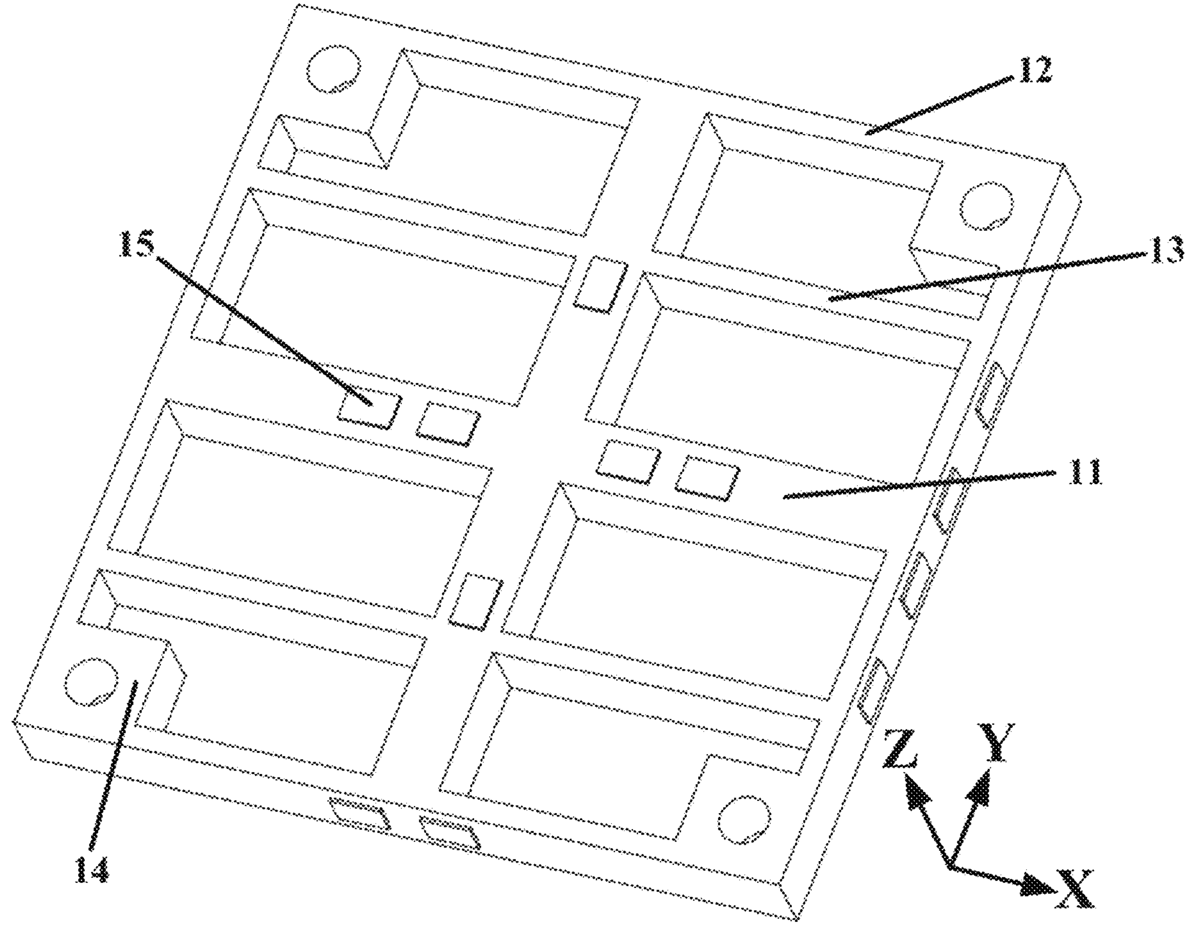
FIG. 1 is a schematic diagram of a structure based on improved cross beam of the present disclosure.

In order to describe the direction conveniently, a spatial Cartesian coordinate system as shown in FIG. 1 is established. The present disclosure provides a six-dimensional force sensor elastomer structure based on improved cross beam and capable of realizing a sputtering process. The structure includes main beams 11, first floating beams 12, second floating beams 13, square corners 14 and strain gauges 15.

As shown in FIG. 1, the main beams 11 are four rectangular beams each with a square section; the four rectangular beams are connected to each other at one end thereof to form a cross, and the other end of each rectangular beam is connected to a corresponding first floating beam 12; the force or the moment act on the center of the cross; the first floating beams 12 are four rectangular thin-walled beams each with a rectangular section; the center of the inner side surface of the first floating beam 12 is connected with the main beam 11, and both ends thereof are connected with the corresponding square corners 14; the second floating beams 13 are four rectangular thin-walled beams each with a rectangular section; the second floating beam 13 is parallel to the horizontal part of main beam 11, and one end of the second floating beam 13 is connected with the main beam 11, and the other end thereof is connected with the first floating beam 12; the axis of the second floating beam 13 is located at the center between the horizontal part of main beam 11 and the horizontal part of first floating beam 12; the square corners 14 are four cylinders of a cuboid structure each with a square section; four connecting holes are formed on the square corners 14 for fixing; and the main beam 11 is in the middle, the first floating beam 12 is at the periphery, the second floating beam 13 is located between the horizontal part of main beam 11 and the horizontal part of first floating beam 12.

Figure 2:
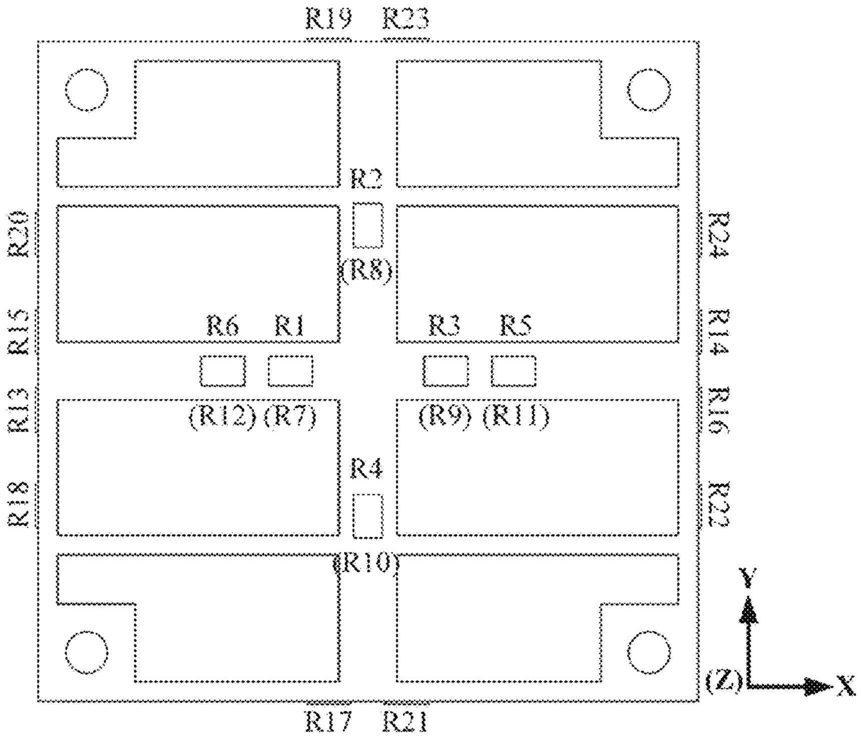
FIG. 2 is a schematic diagram of patch positions of thin film strain gauges of the present disclosure.
Figure 3:
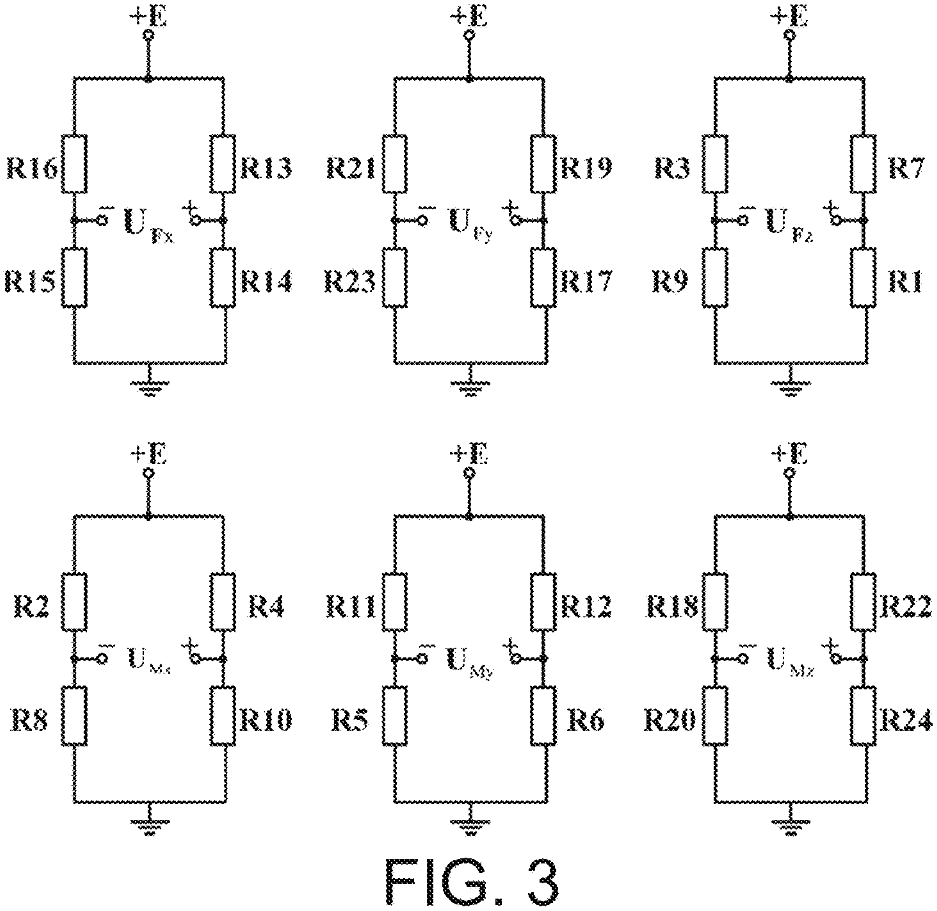
FIG. 3 is a schematic diagram of six sets of bridge circuits of the present disclosure.

FIG. 2 shows patch positions and corresponding numbers R1-R24 of a total of 24 thin film strain gauges of the present disclosure. All strain gauges are identical except for their numbers, that is, they have the same initial resistance value, the resistance value decreases during contraction thereof, and the resistance value increases during extension. The strain gauges are sputtered at the positions where strain is the largest when each main beam is stressed. The strain gauges R1 and R7 on the main beam are sputtered separately on upper and lower surfaces of a rectangular beam close to the center boss in the negative X direction, the strain gauges R3 and R9 on the main beam are sputtered separately on upper and lower surfaces of a rectangular beam close to the center boss in the positive X direction, the strain gauges R2 and R8 on the main beam are sputtered separately on upper and lower surfaces of a rectangular beam away from the center boss in the positive Y direction, the strain gauges R4 and R10 on the main beam are sputtered separately on upper and lower surfaces of a rectangular beam away from the center boss in the negative Y direction, the strain gauges R5 and R11 on the main beam are sputtered separately on upper and lower surfaces of a rectangular beam away from the center boss in the positive X direction, the strain gauges R6 and R12 on the main beam are sputtered separately on upper and lower surfaces of a rectangular beam away from the center boss in the negative X direction, the strain gauges R13 and R15 on the first floating beam are sputtered on an outer side surface of a rectangular thin-walled beam close to the main beam in the negative X direction, the strain gauges R14 and R16 on the first floating beam are sputtered on an outer side surface of a rectangular thin-walled beam close to the main beam in the positive X direction, the strain gauges R17 and R21 on the first floating beam are sputtered on an outer side surface of a rectangular thin-walled beam close to the main beam in the negative Y direction, the strain gauges R19 and R23 on the first floating beam are sputtered on an outer side surface of a rectangular thin-walled beam close to the main beam in the positive Y direction, the strain gauges R18 and R20 on the first floating beam are sputtered on an outer side surface of a rectangular thin-walled beam close to the second floating beam in the negative X direction, the strain gauges R22 and R24 on the first floating beam are sputtered on an outer side surface of a rectangular thin-walled beam close to the second floating beam in the positive X direction, and all strain gauges are sputtered at the positions where strain is the largest when each beam is stressed.

The measurement principle of the six-dimensional force sensor is that: an input force/moment of a certain dimension acts on the center of the elastomer, so that the sensor is deformed and resistance values of thin film strain gauges at corresponding positions change, thereby changing output voltages of corresponding bridges. In addition, due to the special design of the structure, output voltages of other dimensions will not change significantly, which effectively reduces the inter-dimensional coupling interference, thereby improving the measurement accuracy of the sensor. Therefore, during use, it is only necessary to measure voltage changes of all six channels to obtain a value of the force/moment in each dimension. It is assumed that R0 represents a value of zero-point resistance of the strain gauges, and $\Delta R_{Fx}$, $\Delta R_{Fy}$, $\Delta R_{Fz}$, $\Delta R_{Mx}$, and $\Delta R_{Mz}$ represent resistance changes of the strain gauges under the action of Fx, Fy, Fz, Mx, My and Mz respectively. Voltage changes of the output voltage of each channel are as follows:

$$\Delta U_{Fx} = \left(\frac{R14 + \Delta R_{Fx}}{R13 + R14} - \frac{R15 - \Delta R_{Fx}}{R15 + R16}\right)E = \left(\frac{R0 + \Delta R_{Fx}}{2R0} - \frac{R0 - \Delta R_{Fx}}{2R0}\right)E = \frac{\Delta R_{Fx}}{R0}E$$

$$\Delta U_{Fy} = \left(\frac{R19 + \Delta R_{Fy}}{R17 + R19} - \frac{R21 - \Delta R_{Fy}}{R21 + R23}\right)E = \left(\frac{R0 + \Delta R_{Fy}}{2R0} - \frac{R0 - \Delta R_{y}}{2R0}\right)E = \frac{\Delta R_{Fy}}{R0}E$$

$$\Delta U_{Fz} = \left(\frac{R1 + \Delta R_{Fz}}{R1 + R7} - \frac{R9 - \Delta R_{Fz}}{R3 + R9}\right)E = \left(\frac{R0 + \Delta R_{Fz}}{2R0} - \frac{R0 - \Delta R_{Fz}}{2R0}\right)E = \frac{\Delta R_{Fz}}{R0}E$$

$$\Delta U_{Mx} = \left(\frac{R10 + \Delta R_{Mx}}{R4 + R10} - \frac{R8 - \Delta R_{Mx}}{R2 + R8}\right)E = \left(\frac{R0 + \Delta R_{Mx}}{2R0} - \frac{R0 - \Delta R_{Mx}}{2R0}\right)E = \frac{\Delta R_{Mx}}{R0}E$$

$$\Delta U_{My} = \left(\frac{R6 + \Delta R_{My}}{R6 + R12} - \frac{R5 - \Delta R_{My}}{R5 + R11}\right)E = \left(\frac{R0 + \Delta R_{My}}{2R0} - \frac{R0 - \Delta R_{My}}{2R0}\right)E = \frac{\Delta R_{My}}{R0}E$$

$$\Delta U_{Mz} = \left(\frac{R20 + \Delta R_{Mz}}{R18 + R20} - \frac{R24 - \Delta R_{Mz}}{R22 + R24}\right)E = \left(\frac{R0 + \Delta R_{Mz}}{2R0} - \frac{R0 - \Delta R_{Mz}}{2R0}\right)E = \frac{\Delta R_{Mz}}{R0}E$$

It should be noted that the above content is merely used for explaining the technical idea of the present disclosure, and cannot limit the protection range of the present disclosure. Those of ordinary skill in the art may also make some improvements and modifications without departing from the principle of the present disclosure, and these improvements and modifications should also fall within the scope of protection determined in the claims of the present disclosure.

What is claimed is:

1. A sputtered film six-dimensional force sensor elastomer structure based on improved cross beam, comprising beams, first floating beams, second floating beams, square corners and film strain gauges; wherein the beams are four rectangular beams each with a square section; the four rectangular beams are connected to each other at one end of each of the four rectangular beams to form a cross, and the other end of the each of the four rectangular beams is connected to a corresponding first floating beam; the first floating beams are four rectangular walled beams each with a rectangular section; a center of an inner side surface of each of the first floating beams is connected with each of the beams, and both ends of the each of the first floating beams are connected with the corresponding square corners; the second floating beams are four rectangular walled beams each with a rectangular section; each of the second floating beams is parallel to a horizontal part of the beams, and one end of the each of the second floating beams is connected with the beams, and the other end of the each of the second floating beams is connected with the first floating beams; an axis of the each of the second floating beams is located at a center between a horizontal part of beams and a horizontal part of one of the first floating beams; the square corners are four cuboid structures each with a square section; four connecting holes are formed on the square corners for fixing; and the beams are in the middle, the first floating beams are at the periphery, the each of the second floating beams is located between the horizontal part of the each of the beams and the horizontal part of the each of the first floating beams; and the film strain gauges are identical, the film strain gauges have the same initial resistance value, a resistance value decreases during contraction of the film strain gauges, and the resistance value increases during extension; a first film strain gauge of the film strain gauges and a seventh film strain gauge of the film strain gauges on a first one of the beams are sputtered separately on an upper surface of the first one of the beams and a lower surface of the first one of the beams located beside a center boss in a negative X direction, a third film strain gauge of the film strain gauges and a ninth film strain gauge of the film strain gauges on a second one of the beams are sputtered separately on an upper surface of the second one of the beams and a lower surface of the second one of the beams located beside the center boss in a positive X direction, a second film strain gauge of the film strain gauges and an eighth film strain gauge of the film strain gauges on a third one of the beams are sputtered separately on an upper surface of the third one of the beams and a lower surface of the third one of the beams away from the center boss in a positive Y direction, a fourth film strain gauge of the film strain gauges and a tenth film strain gauge of the film strain gauges on a fourth one of the beams are sputtered separately on an upper surface of the fourth one of the beams and a lower surface of the fourth one of the beams away from the center boss in a negative Y direction, a fifth film strain gauge of the film strain gauges and an eleventh film strain gauge of the film strain gauges on the second one of the beams are sputtered separately on an upper surface of the second one of the beams and a lower surface of the second one of the beams away from the center boss in the positive X direction, a sixth film strain gauge of the film strain gauges and a twelfth film strain gauge of the film strain gauges on the first one of the beams are sputtered separately on an upper surface of the first one of the beams and a lower surface of the first one of the beams away from the center boss in the negative X direction, a thirteenth film strain gauge of the film strain gauges and a fifteenth film strain gauge of the film strain gauges on a first one of the first floating beams are sputtered on an outer side surface of the first one of the first floating beams located beside the beams in the negative X direction, a fourteenth film strain gauge of the film strain gauges and a sixteenth film strain gauge of the film strain gauges on a second one of the first floating beams are sputtered on an outer side surface of the second one of the first floating beams located beside the second one of the beams in the positive X direction, a seventeenth film strain gauge of the film strain gauges and a twenty-first film strain gauge of the film strain gauges on a third one of the first floating beams are sputtered on an outer side surface of the third one of the first floating beams located beside the fourth one of the beams in the negative Y direction, a nineteenth film strain gauge of the film strain gauges and a twenty-third film strain gauge of the film strain gauges on a fourth one of the first floating beams are sputtered on an outer side surface of the fourth one of the first floating beams located beside the third one of the beams in the positive Y direction, an eighteenth film strain gauge of the film strain gauges and a twentieth film strain gauge of the film strain gauges on the first one of the first floating beams are sputtered on an outer side surface of the first one of the first floating beams located beside the second floating beam in the negative X direction, a twenty-second film strain gauge of the film strain gauges and a twenty-fourth film strain gauge of the film strain gauges on the second one of the first floating beams are sputtered on an outer side surface of the second one of the first floating beams located beside the second floating beam in the positive X direction, and all film strain gauges are sputtered at the positions where a strain is the largest when each beam is stressed.

2. A measurement method of the sputtered film six-dimensional force sensor elastomer structure according to claim 1, comprising:

acting an input force or moment of a dimension on a connection position of the beams, deforming the elastomer; and changing resistance values of the film strain gauges at corresponding positions, which results in the changes of output voltages of corresponding bridges.

* * * * *